United States Patent [19]

Wittensoldner et al.

[11] Patent Number: 5,059,777
[45] Date of Patent: Oct. 22, 1991

[54] SCANNING SYSTEM PRESENCE SENSING APPARATUS AND METHOD

[75] Inventors: Christopher J. Wittensoldner, Cambridge; Paul O. Detwiler, New Concord, both of Ohio

[73] Assignee: NCR Corporation, Dayton, Ohio

[21] Appl. No.: 410,698

[22] Filed: Sep. 21, 1989

[51] Int. Cl.$^5$ .......................... G06K 7/10; G06K 7/14
[52] U.S. Cl. .................................. 235/470; 235/454; 235/467; 235/473
[58] Field of Search ............... 235/462, 464, 454, 221, 235/467, 473

[56] References Cited

U.S. PATENT DOCUMENTS

| 3,924,105 | 12/1975 | Gassino et al. | 235/467 |
| 3,953,730 | 4/1976 | Henry et al. | 235/473 |
| 4,006,343 | 2/1977 | Izura et al. | 235/61.11 E |
| 4,034,230 | 7/1977 | Brill et al. | 235/467 |
| 4,127,776 | 9/1978 | Thayer | 340/674 |
| 4,240,064 | 12/1980 | DevChoudhury | 340/146.3 |
| 4,243,876 | 1/1981 | Engel et al. | 235/455 |
| 4,315,245 | 2/1982 | Nakahara et al. | 340/146.3 |
| 4,418,276 | 11/1983 | Yatsunami | 235/462 |
| 4,431,912 | 2/1984 | Dickson et al. | 235/466 |
| 4,575,623 | 3/1986 | Cononi et al. | 235/454 |
| 4,575,625 | 3/1986 | Knowles | 235/467 |
| 4,789,775 | 12/1988 | McClain et al. | 235/462 |

OTHER PUBLICATIONS

U.S. Patent Application Ser. No. 410,685; filed Sep. 21, 1989; NCR Docket No. 4438; assigned to NCR Corporation.

Primary Examiner—Stuart S. Levy
Assistant Examiner—Christopher R. Glembocki
Attorney, Agent, or Firm—Wilbert Hawk, Jr.; Albert L. Sessler, Jr.; Paul W. Martin

[57] ABSTRACT

A scanning system having a laser and a motor for spinning an optical mirror arrangement for sensing indicia such as bar codes is capable of turning off the laser and the motor during periods of extended inactivity in order to minimize wear of these components and to reduce the use of electricity. Changes in the ambient light level adjacent to the scanning system which are typical of human motion are detected and are used to produce an electrical signal which can be used to turn the laser and the motor back on.

16 Claims, 5 Drawing Sheets

SCANNING SYSTEM PRESENCE SENSING APPARATUS AND METHOD

CROSS-REFERENCE TO RELATED APPLICATION

Laser Scanner Safety Apparatus and Method, U.S. Pat. No. 5,023,818, inventors Christopher J. Wittensoldner, J. Kenneth Burkey and Denis M. Blanford.

BACKGROUND OF THE INVENTION

This invention relates generally to record media scanners, and more particularly relates to an apparatus and method for causing a laser and a motor of said scanner to have power applied thereto only in the presence of an operator of the scanner or for a predetermined duration of time after the presence of an operator has been detected.

In recent years, retail establishments have made increasing use of coded indicia printed on articles or on tags affixed to articles, in order to facilitate speed and accuracy in check-out operations. One widely used code is the Uniform Product Code, which employs a plurality of parallel bars. Such codes are customarily read or scanned by a scanning device which may conveniently be associated with a point-of-sale terminal operated by a cashier. Bar code scanners customarily employ a laser as a light source, and also employ a motor to drive suitable optical devices which produce a scan pattern using the light beam from the laser. The light thus produced is reflected from the bar code symbol and is detected and decoded by the scanning device to provide the necessary information relating to the article being scanned. The laser and motor of a typical scanning system are actually in use during only a small portion of the total business day, when scanning operations are actually being performed. Particularly in certain types of retail establishments, there may be relatively long periods when no scanning operations are performed by a given scanning device. For example, in a grocery store certain check-out lanes may be closed except during rush-hour periods. The useful lifetime of the lasers and motors which form a part of such scanning devices can thus be prolonged if they are activated only when the scanning device is in service. An apparatus and method which would monitor scanner activity in a manner transparent to the operator, that is, without requiring the active intervention of the operator, would therefore be most helpful.

SUMMARY OF THE INVENTION

In the present invention, a scanning system includes a detector system which is capable of constantly monitoring changes in the level of ambient light adjacent to the scanning system. The detector system not only detects changes in the light level but also filters these changes to determine the presence of frequencies which are the same as those associated with normal human motion. The detector system is capable of performing its function under any normal level and type of ambient light. A signal indicating the presence of human motion is used to activate the scanning system in the event that the laser and the motor of the scanning system have previously been turned off due to an earlier period of extended inactivity of the scanning system.

In accordance with a first embodiment of the invention, record media scanning apparatus capable of being activated by movement in the frequency range of human motion adjacent to said apparatus comprises: motor driver means for driving a motor forming part of said scanning apparatus; laser power supply means for providing power to a laser which provides light for operation of said scanning apparatus; detection means for detecting changes in ambient light impinging on said detection means and providing a signal representative of the frequency of said changes; transmission means for conveying ambient light to said detection means; amplifying and filtering means coupled to said detection means for receiving said signal therefrom, amplifying said signal, and filtering said signal to retain those frequencies of the signal which are representative of human motion; comparison means coupled to said amplifying and filtering means for receiving the amplified and filtered signal therefrom and comparing said signal with a predetermined reference signal to provide an operator activity signal when said amplified and filtered signal has a predetermined relationship to said reference signal; and data processing means coupled to said comparison means to receive said operator activity signal therefrom and coupled to said motor driver means and to said laser power supply means for operating said motor driver means and said laser power supply means in response to receiving said operator activity signal from said comparison means.

In accordance with a second embodiment of the invention, a method of operating a record media scanning apparatus having a motor for operating elements of said apparatus and a laser for providing a scanning beam, comprises the following steps: providing power to said apparatus; turning on said motor; turning on said laser; performing a scanning operation; timing a period of inactivity following any scanning operation and determining whether or not said period exceeds a predetermined duration; if said period exceeds said predetermined duration, turning off said laser and said motor; determining the presence of any human activity adjacent said scanning apparatus following said period of inactivity of predetermined duration; and turning on said laser and said motor in response to the detection of human activity adjacent said scanning apparatus; said step of determining the presence of any human activity adjacent said scanning apparatus comprising the steps of detecting changes in ambient light by providing an electrical signal representative of said ambient light, amplifying and filtering said electrical signal and comparing the resulting signal to a reference signal.

It is accordingly an object of the present invention to provide a novel and efficient scanning system motion detection apparatus and method.

Another object is to provide a motion detector for a scanning system which will detect changes in ambient light and determine whether these changes include frequencies related to human motion.

Another object is to prolong the useful life of the laser and motor included in a scanner system by causing them to be activated only when the scanner system is to be operated.

With these and other objects, which will become apparent from the following description, in view, the invention includes certain novel features of construction and combinations of parts, a preferred form or embodiment of which is hereinafter described with reference to the drawings which accompany and form a part of this specification.

DESCRIPTION OF THE PREFERRED EMBODIMENT

Figure 1:
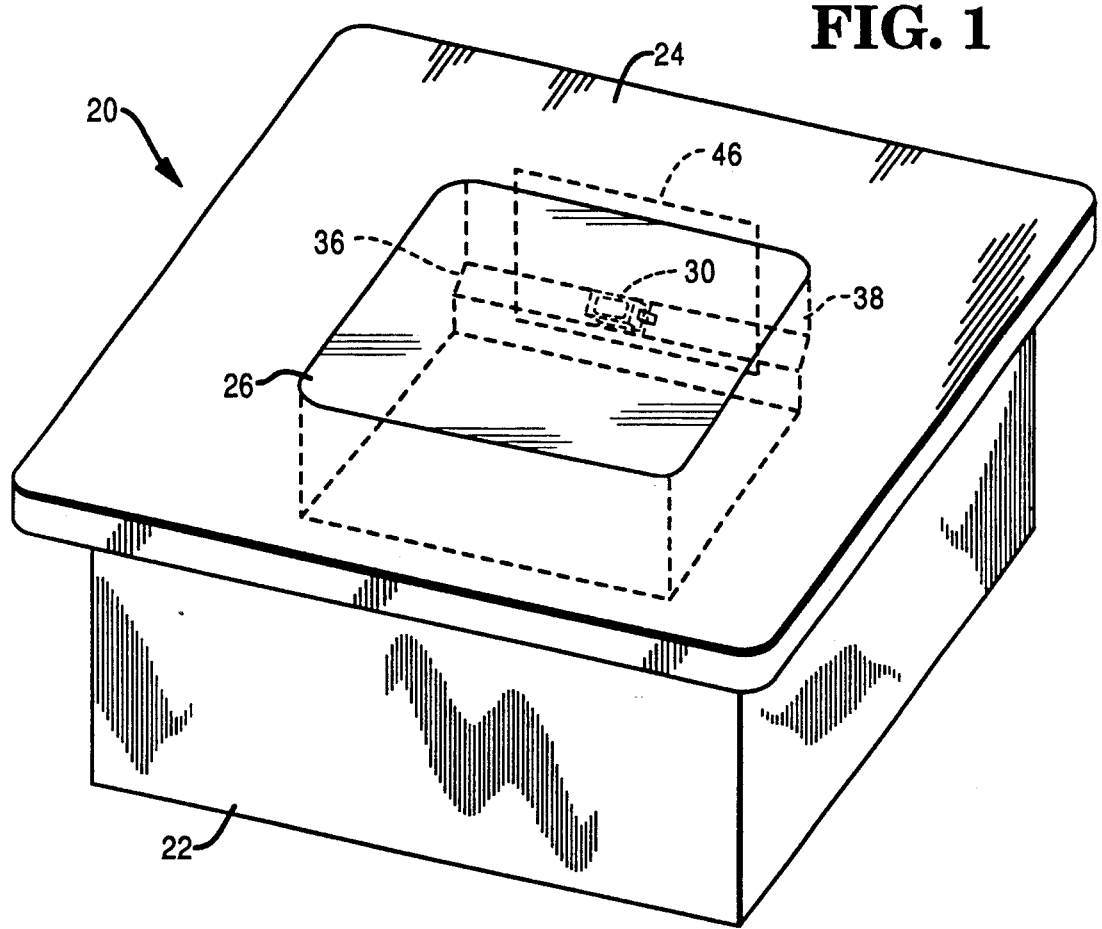
FIG. 1 is a perspective view, partially broken away, of a scanner embodying the present invention, showing the ambient light detector.

Referring now to FIG. 1, shown there is a scanning mechanism 20, which includes an enclosure 22 housing the laser, optical elements and motor which are included in a conventional scanning mechanism. A flat upper surface 24 is provided with a transparent window 26 of glass or other suitable material. Light beams forming a scanning pattern are directed through the window and impinge upon a tag or container bearing a bar code symbol which is to be sensed. Light beams reflected from the symbol are reflected back through the window 26 to a sensing device (not shown), where they are converted to electrical signals representative of the bar code being sensed. The scanning mechanism 20 may be positioned in a recess in a table or counter so that its upper surface is level with the upper surface of the table or counter to facilitate movement of articles to be purchased past the scanner for sensing thereof. Alternatively, the scanning mechanism may be positioned in some other orientation, such as vertically, if desired, for certain types of scanning applications.

Figure 3A:
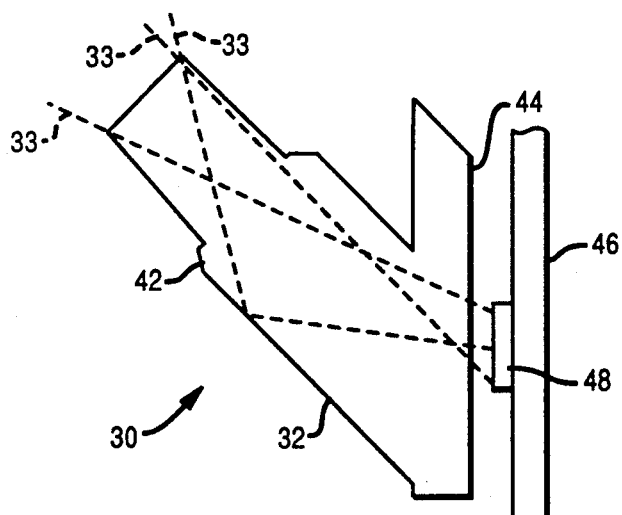
FIG. 3A is a diagrammatic view of a light pipe, showing the manner in which light is transmitted therethrough.
Figure 3B:
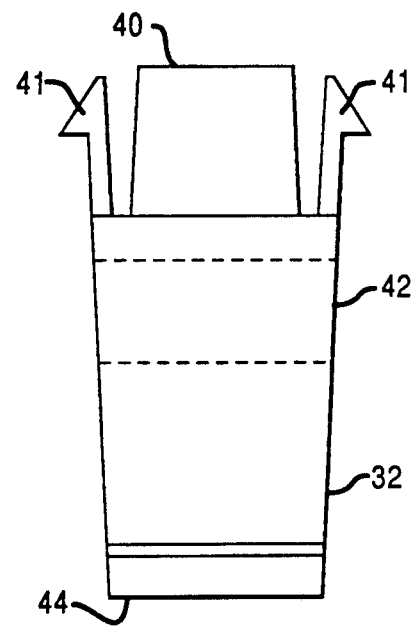
FIG. 3B is an elevation view of the light pipe.
Figure 2:
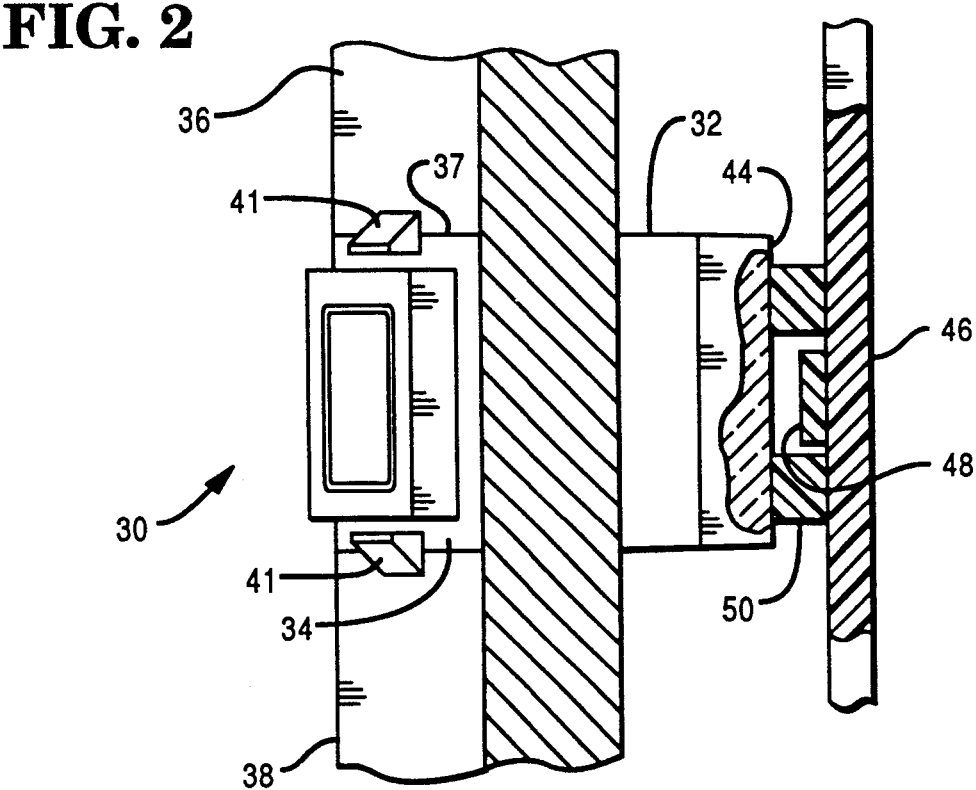
FIG. 2 is a fragmentary plan view, partially in section, of the ambient light detector and adjacent scanner structure.
Figure 3:
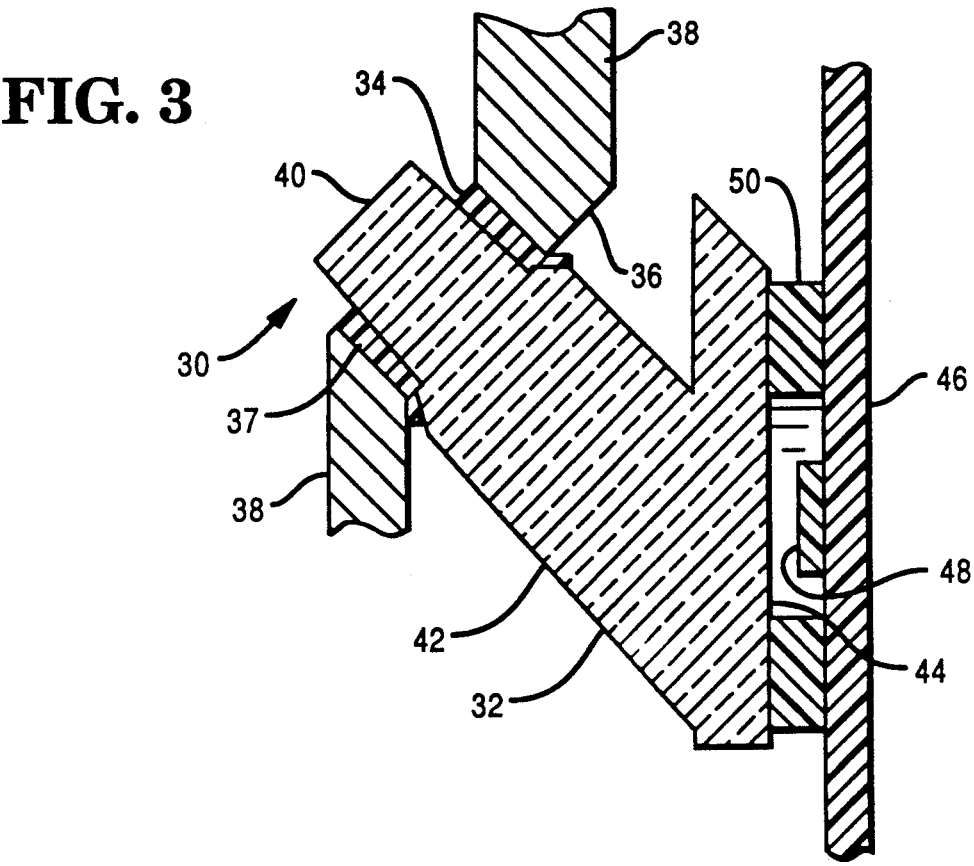
FIG. 3 is a fragmentary elevation view, partially in section, of the ambient light detector and adjacent scanner structure.

Included in the scanning mechanism as a part of the present invention is an optical sensing device 30, which is shown in FIGS. 1 to 3 inclusive, 3A and 3B as comprising a light pipe 32 which extends through an aperture 34 in an angled portion 36 of the scanner wall 38. A gasket 37 is positioned in the aperture 34 and around the light pipe 32 to prevent contamination of the scanner cavity. As may best be seen in FIG. 3, the light pipe 32 includes an end portion 40 which projects at an acute angle with respect to the vertical portion of the wall 38, and at right angles to the angled portion 36, through the aperture 34 so that it is positioned to detect changes in ambient light which passes through the window 26 into the space adjacent to the end portion 40 of the light pipe 32, and then through the light pipe 32, as represented by light rays 33 (FIG. 3A). The light pipe 32 also includes a body portion 42 which is an extension of the end portion. The body portion 42 terminates in an enlarged base having a bottom surface 44, the plane of which is disposed at an acute angle to the longitudinal axis of the body portion 42. The light pipe 32 is held in position in the aperture 34 of the wall 38 by a pair of retaining clips 41 which are integral with the light pipe 32.

Positioned on the other side of the wall 38 from the end portion 40 of the light pipe 32 is a printed circuit board 46. A photodiode 48 is located on the side of the board 46 closest to the light pipe 32 and is in close proximity to the bottom surface 44 of the base of the light pipe 32. A gasket 50 is disposed around the photodiode 48 and between the board 46 and the bottom surface 44 to prevent contamination of the photodiode 48.

Figure 4:
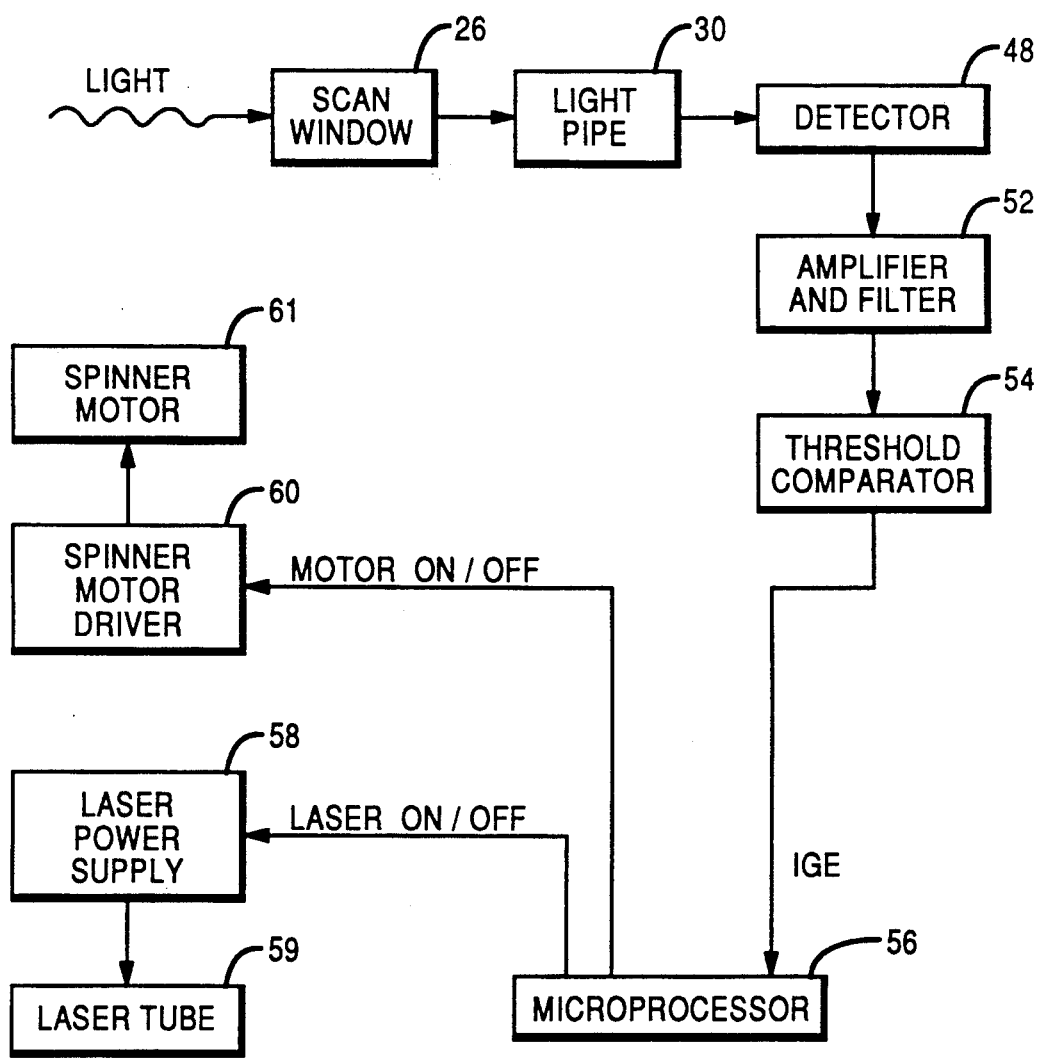
FIG. 4 is a block diagram of the scanner system, including the motion detector and associated circuitry.

FIG. 4 is a block diagram showing the various components making up the system of the present invention. As noted above, ambient light is transmitted through the scan window 26 and impinges on the light pipe 32, which carries it to the detector 48, where it is converted to an electrical signal representative of the intensity and frequency of the ambient light. This signal is then amplified and filtered in an amplifier and filter circuit 52. The resulting signal is compared to a reference signal in a threshold comparator 54, and the output of that circuit is applied to a microprocessor 56 as the signal IGE which controls operation of said microprocessor, which may be of type 8052, manufactured by Intel Corporation, Santa Clara, Calif. The microprocessor 56 in turn controls operation of a laser power supply 58 for a laser 59, and controls operation of a spinner motor driver 60, which drives a motor 61, as will subsequently be described. The laser power supply may be of type 103-17, manufactured by Laser Drive, Gibsonia, Pa. The laser may be of type 1007p-63, manufactured by Uniphase, Manteca, Calif. The spinner motor may be of type B1705H1364, manufactured by Harowe Sero Controls Inc., West Chester, Pa. The motor driver may or may not be included as part of the motor, but in either event, the motor on/off control line from the microprocessor 56 determines motor activity. The laser tube 59 may be of the HeNe gas discharge type which requires a DC to DC converting power supply which will transform 12 volts to 1200 volts. The laser on/off control line from the microprocessor 56 to the power supply 58 is used to control the laser power supply 58 and the laser tube 59. If a laser diode is used, the laser diode and its drive circuitry are put in place of the laser tube 59 and the power supply 58.

Figure 6:
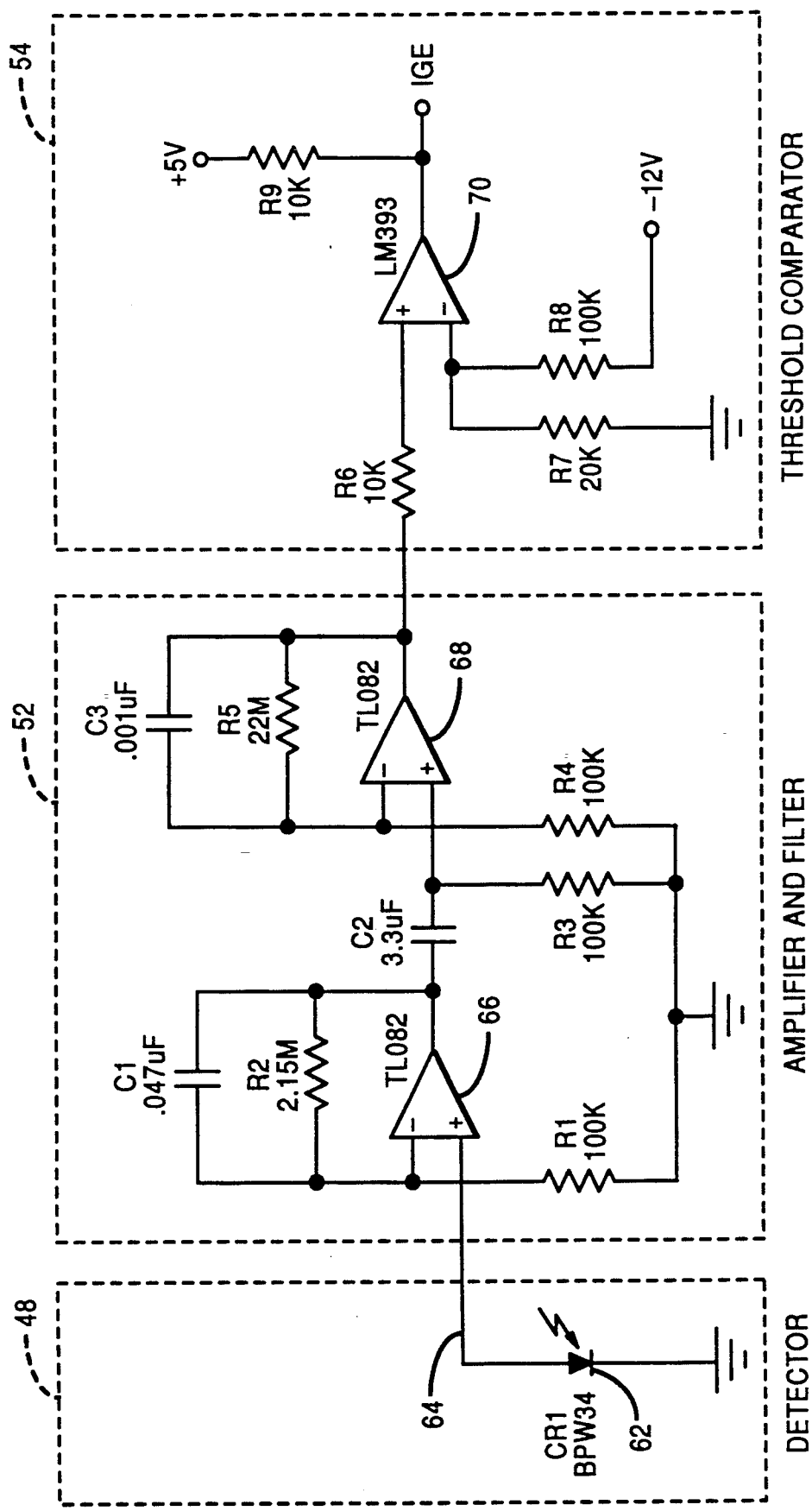
FIG. 6 is a detailed circuit diagram of the motion detection circuitry.

Referring now to FIG. 6, the detector 48, the amplifier and filter 52 and the threshold comparator 54 are shown in detail. At the left of FIG. 6, the detector 48 comprises a photovoltaic cell 62 used in a zero bias configuration, with one side connected to ground and the other side connected by a conductive path 64 to an amplifier 66 in the amplifier and filter circuit 52. The photovoltaic cell 52 may be of type BPW34, manufactured by AEG-Telefunken Corp., Somerville, N.J. Any suitable photovoltaic cell could be used with the appropriate amplifier to match the gain and input characteristics needed. The photovoltaic cell 62 generates a voltage which changes value exponentially with changes in ambient light levels. This is an excellent match with the logarithmic light change caused by the operator's shadow in different ambient light levels. The maximum voltage generated by the detector 48 is about 0.5 volts.

The operational amplifier 66 in the amplifier and filter circuit 52 may be of type TL082, manufactured by Motorola Semiconductor Products, Phoenix, Ariz. Its negative input is connected through a 100K-ohm resistor R1 to ground, and its output is coupled to the positive input of a second operational amplifier 68, which may also be of type TL082, over a 3.3-microfarad capacitor C2. A feedback path extends from the output of the amplifier 66 back to the negative input and includes a 2.15M-ohm resistor R2 in parallel with a 0.047-microfarad capacitor C1.

The positive input of the amplifier 68 is connected to ground through a 100K-ohm resistor R3. The negative input of said amplifier is connected to ground over a 100K-ohm resistor R4. The output of the amplifier 68 is connected through a 10K-ohm resistor R6 to an operational amplifier 70 in the threshold comparator circuit 54, and is also coupled via a feedback path, which includes a 22M-ohm resistor R5 and a 0.001-microfarad capacitor C3, to the negative input of the amplifier 68.

The amplifier and filter circuit 52 performs two functions: (1) amplifying the detector signal about 6930 times, as needed for low light levels, and (2) filtering frequencies not in the range of human motion, such as the 120-Hz signal from the fluorescent lights customarily used in a retail establishment.

The resistors R1, R2, the capacitor C1 and the amplifier 66 provide an amplifier with gain of 21.5 and a low pass filter with a 3-dB point at 2 Hz. The high pass filter formed by capacitor C2 and resistor R3 has a 3-dB point at 0.1 Hz. The resistors R4, R5, the capacitor C3 and the amplifier 68 provide an amplifier with a gain of 220 and a 3-dB point of 32 Hz.

The use of type TL082 devices for amplifiers 66 and 68 was made due to the low input bias and offset current along with the high input resistance. Any amplifier meeting the above specifications could be used. The resistors are all 1% tolerance. The capacitors C1, C3 are glass capacitors chosen for their high-frequency characteristics, and C2 is an electrolytic capacitor because of lower frequency requirements.

The negative input of the amplifier 70 is connected through a 20K-ohm resistor R7 to ground, and is also connected through a 100K-ohm resistor R8 to a source of $-12$-volts potential. The amplifier 70 may be of type LM393 manufactured by Motorola Semiconductor Products. The output of the amplifier 70 is connected through a 10K-ohm resistor R9 to a source of $+5$-volts potential, and provides the output signal IGE which is applied to the microprocessor 56.

The threshold comparator circuit 54 is used to set a level of activity which determines when an operator activity signal IGE should be sent to the microprocessor 56. The resistors R7 and R8 establish a reference voltage level which the output of the amplifier 68 must exceed before the amplifier 70 will trigger the signal IGE to the microprocessor 56. The resistor R6 serves to buffer the input on the amplifier 70. The resistor R9 is a pull-up resistor for the open collector output of the amplifier 70. All resistors are 1% tolerance. Any comparator device which has the appropriate input offset voltages and an open collector output can be used for the amplifier 70.

Figure 5:
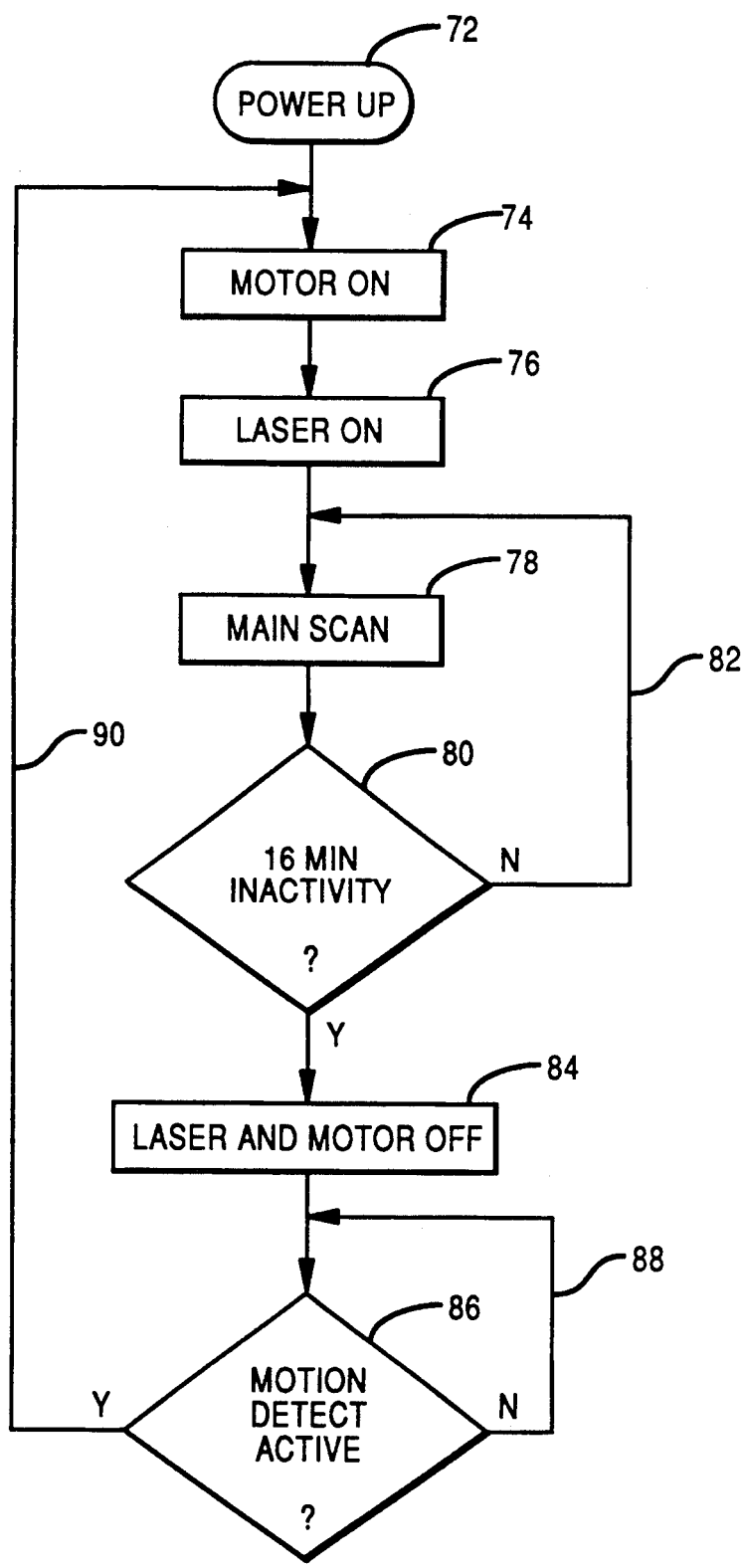
FIG. 5 is a flow diagram, showing the operation of the scanner system, including the deactivation of the system after a predetermined period of inactivity, and its reactivation in the event of human motion adjacent to the system.

The flow diagram of FIG. 5 shows the sequence of operation of the system of the present invention. In the normal course of operation, the scanner 20 is powered up, as represented by block 72, and the motor and laser are turned on, as represented by blocks 74 and 76. Scanning operations are then performed, as represented by block 78. The period of inactivity between successive uses of the scanner is monitored by a timer in the microprocessor 56, as represented by the block 80. If the inactivity continues for a lesser duration than a predetermined period, which is sixteen minutes in the illustrated embodiment, and is then interrupted by another use of the scanner 20, the timer in the microprocessor 56 is reset to its original setting, and the process returns to perform another main scan, as represented by path 82. On the other hand, if the inactivity continues for a longer duration than the predetermined period, the laser and motor are turned off, as represented by block 84, and the system enters a "sleep" mode, as represented by block 86.

The system remains in this mode, as represented by path 88, until the microprocessor 56 receives an IGE signal from the threshold comparator 54, indicating that motion having the predetermined characteristics of human motion has been detected by the detector 48 as a result of changes in ambient light being transmitted through the scan window 26 and the light pipe 30. At that time, the process continues along path 90 to cause the motor and laser to be turned on again, as represented by blocks 74 and 76.

It will be seen that the ability of the scanner 20 to power down the laser and the motor will improve the reliability of the scanner by decreasing the amounts of time that these devices are in an active power-up state, and will also provide the owner with a lower cost of ownership by reason of lower utility bills and fewer service calls.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. A record media scanning apparatus capable of being activated by movement in the frequency range of human motion adjacent to said apparatus, comprising:
   a surface on which articles to be scanned are supported;
   a space beneath said surface defined by a box-like enclosure having a plurality of walls;
   motor driver means for driving a motor forming a part of said scanning apparatus;
   laser power supply means for providing power to a laser which provides light for operation of said scanning apparatus;
   a photodetector for detecting changes in the intensity of ambient light impinging on said detection means caused by varying degrees of shadowing and for providing a signal having a frequency representative of the changes and having a level determined by the intensity of the ambient light impinging on said photodetector;
   transmission means having first and second ends, a first end extending from said space to said photodetector for conveying ambient light to said photodetector and a second end extending from an inner surface of said one of said walls at an acute angle into said space;
   amplifying and filtering means coupled to said detection means for receiving the signal therefrom, amplifying the signal, and filtering the signal to provide a single output signal having frequencies representative of human motion;
   comparison means coupled to said amplifying and filtering means for receiving the amplified and filtered signal therefrom and comparing the level of the signal with a threshold signal representative of a predetermined degree of shadowing, which is less than the degree of shadowing during scanning, to provide an operator activity signal when the level of the amplified and filtered signal exceeds the threshold signal; and data processing means coupled to said comparison means to receive the operator activity signal therefrom and coupled to said motor driver means and said laser power supply means for operating said motor driver means and said laser power supply means in response to receiving the operator activity signal from said comparison means.

2. The record media scanning apparatus of claim 1, in which said light transmission means is a light pipe.

3. The record media scanning apparatus of claim 2, in which said light pipe has an enlarged lower end positioned adjacent to said photodetector means.

4. The record media scanning apparatus of claim 3, also including gasket means disposed around said enlarged lower end and said photodetector means.

5. The record media scanning apparatus of claim 1, in which said one of said sides includes a lower vertical portion, an upper vertical portion, and an intermediate angled portion connecting said upper and lower portions, in which said intermediate portion has an aperture therein, and in which a portion of said light transmission means extends through said aperture and projects into said space.

6. The record media scanning apparatus of claim 5, in which said light transmission means includes securing means thereon for securing said light transmission means in said aperture.

7. The record media scanning apparatus of claim 6, in which said light transmission means is a light pipe.

8. The record media scanning apparatus of claim 1, also including gasket means disposed around the extending end of the light transmission means.

9. The record media scanning apparatus of claim 1, in which said photodetector means is secured to the opposite surface of the side from which one end of said light transmission means extends.

10. A method of operating a record media scanning apparatus having a motor for operating elements of said apparatus and a laser for providing a scanning beam, comprising the following steps:

providing power to said apparatus;
turning on said motor;
turning on said laser;
performing a scanning operation;
timing a period of inactivity following any scanning operation and determining whether or not said period exceeds a predetermined duration dependent upon the rate of scanning operations;
if said period is less than said predetermined duration, there being a scanning operation within the predetermined duration, causing said laser and said motor to remain on and reinitiating said step of timing said period;
if said period exceeds said predetermined duration, turning off said laser and said motor;
determining the presence of any human activity adjacent said scanning apparatus following said period of inactivity of predetermined duration; and
turning on said laser and said motor in response to the detection of human activity adjacent said scanning apparatus;
said step of determining the presence of any human activity adjacent said scanning apparatus comprising the steps of detecting changes in ambient light caused by varying degrees of shadowing by providing an electrical signal representative of said ambient light, amplifying and filtering said electrical signal to provide a single electrical output signal having frequencies which are representative of human motion, and comparing the resulting output signal to a predetermined reference signal representative of a predetermined degree of shadowing within a range of shadowing extending from the degree of shadowing during scanning to a predetermined degree of shadowing less than the degree of shadowing during scanning.

11. The method of claim 10 in which data processing means is provided and controls said laser and said motor to turn them on in response to receiving a signal representative of human activity.

12. The method of claim 10 in which the predetermined duration of said period of inactivity is sixteen minutes.

13. The method of claim 10 in which said record media scanning apparatus includes a surface on which articles to be scanned are supported and a space beneath said surface in which scanning means are placed, and in which said changes in ambient light are detected by sampling ambient light within said space below said surface.

14. The method of claim 13 in which said ambient light is conducted from said space below said surface to a photodetector by a light pipe.

15. A record media scanning apparatus capable of being activated by movement in the frequency range of human motion adjacent to said apparatus, comprising:

a surface on which articles to be scanned may be supported;
a space beneath said surface defined by a box-like enclosure, one side of the box-like enclosure including a lower vertical portion, an upper vertical portion, and an intermediate angled portion connecting the upper and lower portions, in which the intermediate portion has an aperture therethrough;
detection means secured to an outer surface of the one side for detecting changes in the intensity of ambient light impinging on said detection means caused by varying degrees of shadowing and for providing a signal having a frequency representative of the changes and having a level determined by the intensity of the ambient light impinging on said detection means;
transmission means for conveying ambient light to said detection means having first and second ends, the first end extending from an inner surface of the one side at an acute angle thereto, the second end extending from the outer surface of the one side and having an enlarged lower portion positioned adjacent to said detection means, said transmission means extending through the aperture and including securing means thereon for securing said transmission means in the aperture;
a first gasket disposed in the aperture and around the first end of said transmission means;
a second gasket disposed around the enlarged lower portion and said detection means;
amplifying and filtering means coupled to said detection means for receiving the signal therefrom, amplifying the signal, and filtering the signal to provide a single output signal having frequencies representative of human motion;

comparison means coupled to said amplifying and filtering means for receiving the amplified and filtered signal therefrom and comparing the level of the signal with a threshold signal representative of a predetermined degree of shadowing, which is less than the degree of shadowing during scanning, to provide an operator activity signal when the level of the amplified and filtered signal exceeds the threshold signal;

motor driver means for driving a motor forming a part of said scanning apparatus;

laser power supply means for providing power to a laser which provides light for operation of said scanning apparatus; and data processing means coupled to said comparison means to receive the operator activity signal therefrom and coupled to said motor driver means and said laser power supply means for operating said motor driver means and said laser power supply means in response to receiving the operator activity signal from said comparison means.

16. The record media scanning apparatus as recited in claim 15, wherein the predetermined degree of shadowing is within a range of shadowing extending from the degree of shadowing during scanning to a predetermined degree of shadowing less than the degree of shadowing during scanning.

* * * * *